United States Patent [19]

Case et al.

[11] 4,371,180
[45] Feb. 1, 1983

[54] GASKET MATERIAL

[75] Inventors: Edward M. Case, Weston; Chester S. Hopper, Newtown, both of Conn.

[73] Assignee: The Marlo Company Incorporated, Newton, Conn.

[21] Appl. No.: 133,048

[22] Filed: Mar. 24, 1980

[51] Int. Cl.³ ............................ F16J 9/20; F16J 15/22
[52] U.S. Cl. ................................................... 277/230
[58] Field of Search .......... 277/229, 230, 231, DIG. 6

[56] References Cited

U.S. PATENT DOCUMENTS

| | | | |
|---|---|---|---|
| 2,157,867 | 5/1939 | Robertson et al. | 277/230 |
| 3,206,229 | 9/1965 | Kramer | 277/230 |
| 3,646,846 | 3/1972 | Houghton et al. | 277/230 |
| 3,791,658 | 2/1974 | Zumeta | 277/230 |
| 4,298,562 | 11/1981 | Latty | 277/DIG. 6 |

Primary Examiner—Robert I. Smith
Attorney, Agent, or Firm—Blum, Kaplan, Friedman, Silberman & Beran

[57] ABSTRACT

A gasket material combines a braided organic fiber sleeve for conformability with a vitreous fiber sleeve for reinforcement thereof. The gasket material is impregnated with polytetrafluoroethylene as a sealant. In another embodiment a sleeve is braided of yarn containing both inorganic and organic fibers, the different fibers being spun or twisted together. The reinforcement provided by the vitreous fiber makes it possible to use the gasket material to retain fluid at higher pressures than is possible with organic fiber alone. Gasket arrangements are disclosed which provide against leakage at the cut ends of the gasket material.

Preferred organic fibers are polytetrafluoroethylene and aramid. Preferred vitreous fibers are electrical, structural and chemical grades glass fiber.

2 Claims, 9 Drawing Figures

GASKET MATERIAL

BACKGROUND OF THE INVENTION

Gasket material for pressure vessels and chemical piping requires an array of special properties which is difficult to obtain in any single material. The requirements include conformability with limited cold flow, properties which are essentially antithetical to each other, as well as chemical inertness, operability at high termperature and low cost. Polytetrafluoroethylene (TFE) has been widely used because of the wide range of chemicals to which it is inert. However, it suffers from excessive cold flow, so that in gasket form it cannot be used to withstand internal pressures in excess of 200 psi at 250° F. and in excess of 30 psi at 450° F. This imposes a severe limitation on the practical utility of the material, since there are many applications in which the pressures normally exceed this limit. Moreover, it cannot be used where there is a possibility of a brief surge of pressure above this limit, since the cold flow is relatively rapid.

Other organic fibers which may be used as gasket materials are aramid, manufactured by DuPont under the trade name of "Kevlar", nylon, polyethylene and polypropylene. While these materials exhibit lower cold flow than does TFE, they are not so inert chemically. Accordingly, it would be desirable to provide a gasket material which is operable at higher pressures than is TFE tape, which is lower in cost and which is yet resistant to a wide range of chemicals. The present invention is designed to meet this end.

SUMMARY OF THE INVENTION

The gasket material in accordance with the present invention comprises an organic fiber combined with a vitreous, i.e., inorganic, fiber, the combination being impregnated with TFE dispersion as sealant. The organic fiber is reinforced with vitreous fiber, thereby minimizing cold flow beyond that necessary for conforming to the surfaces which must be sealed. Additional conformability is provided by the dispersed TFE.

Suitable fibers are of TFE, aramid, polyethylene, polypropylene and nylon, TFE fibers being preferred for chemical inertness and aramid fibers being preferred for strength and minimization of cold flow. Suitable vitreous fibers are chemical grade glass fibers, structural grade glass fibers, electrical grade glass fibers, ceramic fibers and quartz fibers.

The organic fibers and the vitreous fibers may be twisted together, laid up together or spun together to form yarn or strands which are then braided together to form a sleeve or series of sleeves; in another embodiment, the gasket material is a braided outer sleeve of organic fiber around a braided base sleeve of vitreous fiber, the combination being impregnated with dispersed TFE. In another embodiment of the invention, a braided inner sleeve of organic fiber is present within the base sleeve of vitreous fiber. The tubular sleeves are preferably calendered into rectangular section either before or after impregnation with TFE dispersion and drying of same. Preferably, in making a gasket, the ends are shaped so as to provide reinforcement by the vitreous sleeve against the effect of lateral pressure by the fluid to be contained.

Accordingly, an object of the present invention is a braided sleeve gasket of an improved gasket material which can be used at higher temperatures and pressures than has hitherto been possible.

Another object of the present invention is a gasket material resistant to a wide range of chemicals at elevated temperature and pressure.

A further object of the present invention is a gasket material having desirable operational characteristics which is low in cost.

An important object of the present invention is a gasket in the form of a sleeve so that the ends thereof may be interlocked.

Still other objects and advantages of the invention will in part be obvious and will in part be apparent from the specification.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1A:
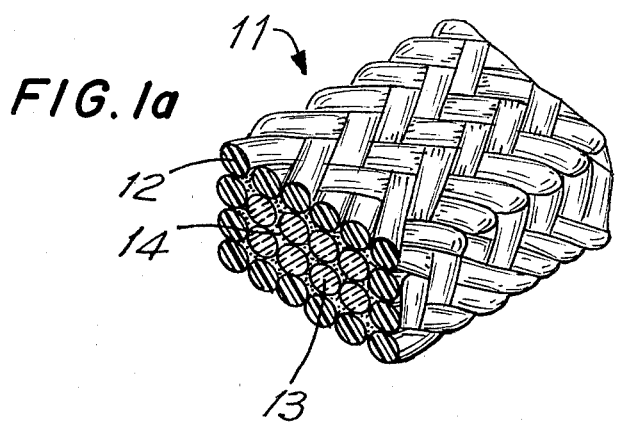
FIG. 1a is a perspective view of a cut end of gasket material in accordance with the present invention.

A gasket material in accordance with the present invention is indicated generally by the reference numeral 11 in FIG. 1a, said gasket material comprising a braided outer sleeve of organic fiber 12 surrounding a base sleeve of vitreous fiber 13, said base sleeve also being braided. Gasket material 11 is impregnated with dispersed TFE which is subsequently dried. The impregnation may be carried out at any stage, that is, either before or after braiding, or both before and after. Preferably, the vitreous fiber is impregnated prior to braiding, since the impregnant serves as a lubricant. Suitable organic fibers are TFE, aramid, polyethylene, polypropylene and nylon, TFE and aramid being preferred. Suitable vitreous fibers are chemical, structural and electrical grade glass fiber, ceramic and quartz, chemical grade glass fiber being preferred because of its greater resistance to attack by chemicals. The impregnant is indicated by the reference numeral 14, the preferred impregnant being dispersed TFE. However, starch can be used where the fluid to be retained in nonaqueous.

In the manufacture of the embodiment of FIG. 1a, vitreous fiber 13 is first braided and then organic fiber 12 is braided over the vitreous fiber. This type of construction is known as braid-over-braid. The weight ratio of inorganic fiber to organic fiber may lie within 5:95 and 95:5 but preferably lies between 20:80 and 80:20. After braiding, the material is calendered into rectangular section. As aforenoted, the fibers may be impregnated either before or after braiding.

Figure 1B:
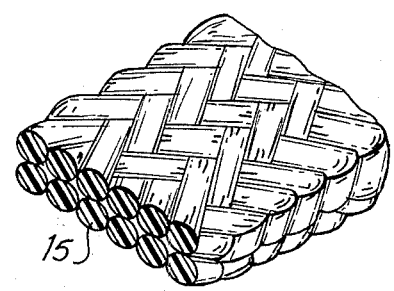
FIG. 1b is a perspective view of a cut end of another embodiment in the form of a single sleeve, strands in said sleeve including both inorganic and organic fibers, twisted, spun or laid up together.

In the manufacture of the embodiment of FIG. 1b inorganic and organic fibers are twisted or spun or laid up together to form yarn or strands 15 and these are then braided into one or more sleeves. In the gasket of FIG. 1b only one sleeve is shown. The number of sleeves may be as great as is needed for the particular application. In general the weight of each component may lie between 5% and 95% but preferably lies between 10% and 90%. The impregnant is preferably dispersed TFE.

Figure 1C:
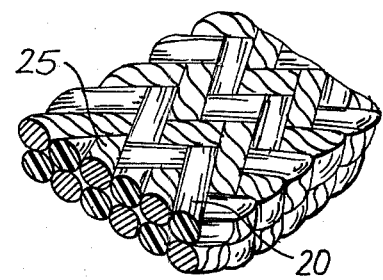
FIG. 1c is a perspective view of a cut end of yet another embodiment in the form of a single sleeve wherein individual strands are either of inorganic fiber or organic fiber, both types of fiber being present in the sleeve.

In the manufacture of the embodiment of FIG. 1c some strands 20 contain only inorganic fibers and other strands 25 contain only organic fibers. Again, as in FIG. 1b only a single sleeve is shown, but the gasket may be of any desired number of sleeves, one over the other. Also, in the construction of FIG. 1b, a single strand may contain both inorganic and organic fibers.

Figure 2:
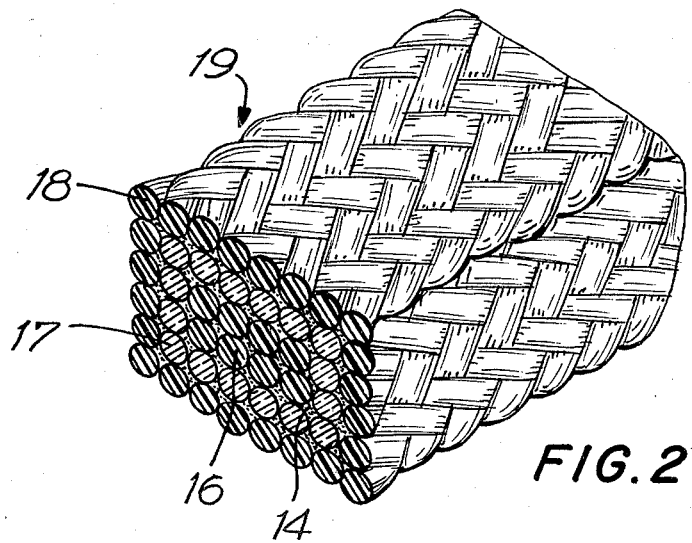
FIG. 2 is a perspective view of a cut end of another embodiment of the invention.

The embodiment of FIG. 2 is a modification of that of FIG. 1a. In the embodiment of FIG. 2, an inner sleeve of organic fibers 16 is first formed by braiding, after which a base sleeve of vitreous fiber 17 is braided over the inner sleeve and, finally, an outer sleeve of organic fiber 18 is braided over the base sleeve of vitreous fiber 17. The gasket material indicated generally by the reference numeral 19 is impregnated, preferably with TFE dispersion and dried at any stage of the manufacture.

Figure 3:
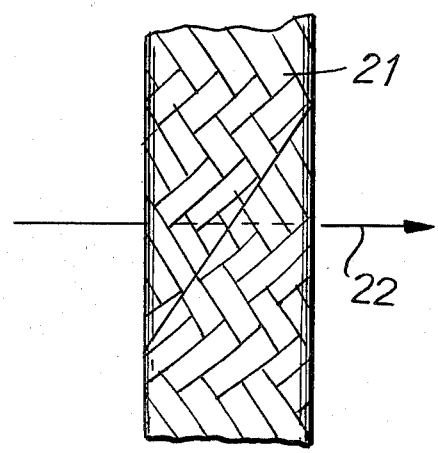
FIG. 3 illustrates a method of joining the ends of a gasket in accordance with the present invention.

In preparing the gasket material for sealing the cover of a pressure vessel to the vessel itself or lengths of pipe together, the gasket material must be cut. Where the cut is perpendicular to the general direction of the gasket, fluid pressure may force the gasket in a direction lateral to the gasket itself. To prevent this, the gasket should be cut so that resistance to fluid pressure is provided by the vitreous fiber. As shown in FIG. 3, gasket material 21 is cut diagonally so that fluid pressure in the direction indicated by the arrow 22 is resisted by both the organic and the vitreous fiber, the major portion of the resistance to displacement or cold flow being provided by the vitreous fiber.

Figure 4:
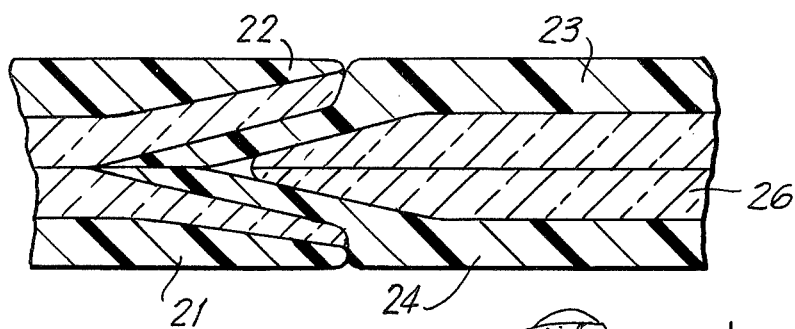
FIG. 4 is a sectional view of a gasket in accordance with the present invention.

Another means of preparing the cut ends of the gasket material is illustrated in FIG. 4. To prepare the construction shown in FIG. 4, end 22 of gasket material 21 is first opened up, the braided structure making this possible. End 23 of the gasket material is then inserted into the open end 22. When pressure is applied by the flanges (not shown) being sealed together, the organic fibers 24 and inorganic fibers 26 deform as indicated in FIG. 4 to achieve an arrangement in which the vitreous fibers 26 in the cut ends interpenetrate each other and thereby reinforce the cut ends against the fluid pressure.

Figure 5:
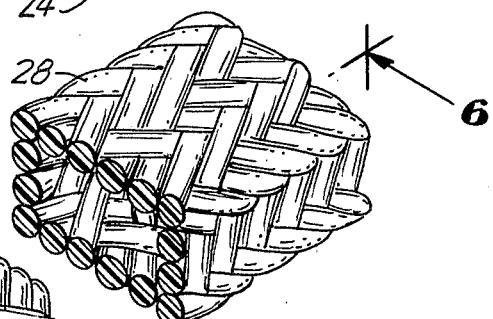
FIG. 5 is an exploded view in perspective of a gasket in accordance with the present invention.
Figure 6:
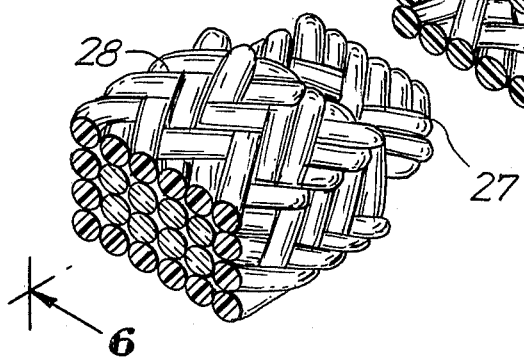
FIG. 6 is a view taken along line 6—6 of FIG. 5.
Figure 6:
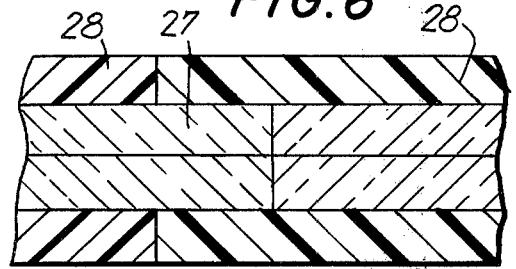

Yet another embodiment is shown in FIGS. 5 and 6, FIG. 5 showing in perspective a tongue-and-groove arrangement in which the tongue includes vitreous fibers for reinforcing the organic fibers at the other end of the gasket. The interior construction is shown in section in FIG. 6, the vitreous fibers being indicated by the reference numeral 27 and the organic fibers being indicated by the reference numeral 28.

As is evident, all of the above constructions can be applied to any of the described gasketing materials.

Figure 7:
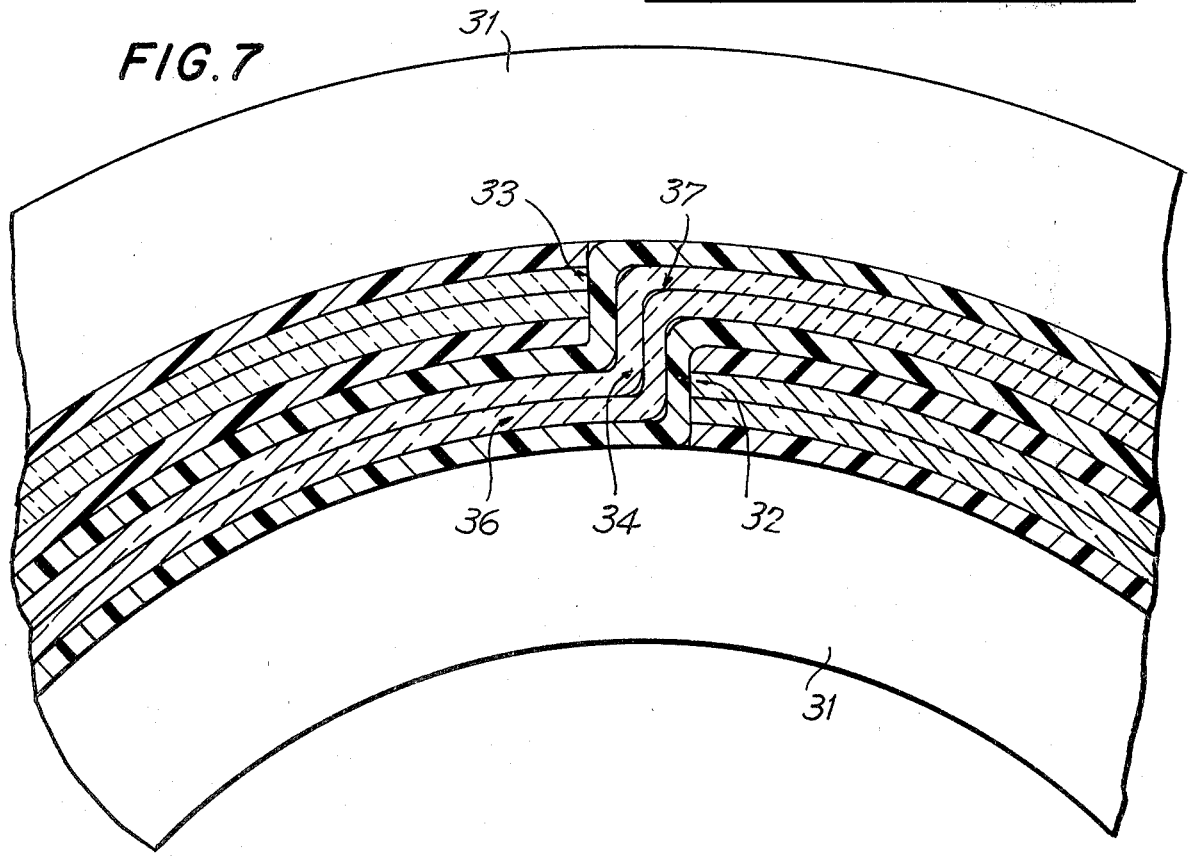
FIG. 7 is a partial sectional view of another gasket in accordance with the present invention.

As the result of the reinforcement provided by the vitreous fiber, especially when the ends are shaped as indicated herein, pressures as high as 400 psi at 250° F. and 60 psi at 450° F. can be retained. By combining these materials, the strength of the vitreous fiber, which causes difficulties when used by itself, is tempered by the soft, cushioning, filling effect of the organic fiber. Similarly, where the softness of the organic fiber is the limiting factor when used alone, it is strengthened and controlled by the use of the vitreous fiber. Finally, the combination of TFE fiber, glass fiber and TFE dispersion completely eliminates the problem of sticking to the metal flanges such as are shown in FIG. 7. In the construction shown in FIG. 7, metal flanges as on a cover and body of a vessel are indicated by the reference numeral 31. The gasket material is cut with square edges, but the length of the gasket material is such that it can form two turns around the vessel, the two turns being in the form of a spiral. The cut ends of the gasket are indicated by the reference numerals 32 and 33, and the length of the gasket material cut is such that it is long enough to lie around the joint as shown in FIG. 7. As pressure is applied to the two coils of the gasket, the gasket material is bent or deformed as shown at 34. Displacement of the gasket at cut end 32, for instance, is prevented by the reinforcement provided by the vitreous fiber at 36 in the lower turn of the gasket. Similarly, displacement of cut end 33 is prevented by the reinforcement provided by the vitreous fibers at point 37 in the upper layer of the gasket material.

The relative thicknesses of the vitreous fiber layer and the organic fiber layer are selected in accordance with the degree of reinforcement and the degree of conformability desired. In general, the weight of the vitreous fiber can be greater than that of the organic fiber, thereby substantially reducing the cost of the gasket material since the inorganic fiber is generally much less expensive than the organic fiber, particularly where the vitreous fiber is of glass, whether electrical or chemical grades, and the organic fiber is of TFE.

It will thus be seen that the objects set forth above, among those made apparent from the preceding description, are efficiently attained, and since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A gasket material consisting essentially of a braided sleeve of organic and vitreous fiber, said organic fiber providing the major portion of the conformability of said gasket and said vitreous fiber reinforceing said gasket against internal pressure, and an impregnant selected from the group consisting of dispersed polytetrafluoroethylene (TFE) and starch, wherein said sleeve comprises a braided base sleeve of vitreous fiber and an outer sleeve of organic fiber over said base sleeve, said impregnant being in all sleeves.

2. Gasket material as claimed in claim 1, further comprising an inner sleeve of organic fiber within said base sleeve of vitreous fiber, said impregnant being in all sleeves.

* * * * *